(12) United States Patent
Kistersky et al.

(10) Patent No.: US 6,548,791 B2
(45) Date of Patent: Apr. 15, 2003

(54) ENERGY STORAGE APPARATUS AND INDUCTOR TOOLS FOR MAGNETIC PULSE WELDING AND FORMING

(75) Inventors: Ludmilla Kistersky, Providence, RI (US); Danylo Dudko, Kiev (UA); Viacheslav Shevchenko, Providence, RI (US); Viktor Sadokhin, Providence, RI (US)

(73) Assignee: Inli, LLC, Providence, RI (US)

( * ) Notice: Subject to any disclaimer, the term of this patent is extended or adjusted under 35 U.S.C. 154(b) by 0 days.

(21) Appl. No.: 09/767,495

(22) Filed: Jan. 23, 2001

(65) Prior Publication Data

US 2002/0108946 A1 Aug. 15, 2002

Related U.S. Application Data

(63) Continuation-in-part of application No. 09/517,958, filed on Mar. 3, 2000, now Pat. No. 6,400,538.

(51) Int. Cl.[7] .............................. H05B 6/10; H05B 6/44
(52) U.S. Cl. ...................... 219/617; 219/603; 219/635; 219/672
(58) Field of Search ................................. 219/617, 635, 219/660, 661, 671, 672, 673, 674, 676

(56) References Cited

U.S. PATENT DOCUMENTS

| | | | | |
|---|---|---|---|---|
| 3,835,282 A | * | 9/1974 | Sass et al. .................. | 219/672 |
| 4,300,031 A | * | 11/1981 | Reboux et al. ............. | 219/617 |
| 4,687,894 A | * | 8/1987 | Koga et al. ................. | 219/674 |
| 5,317,121 A | * | 5/1994 | Katayama et al. .......... | 219/672 |
| 5,352,871 A | * | 10/1994 | Ross et al. .................. | 219/676 |
| 5,824,998 A | * | 10/1998 | Livshiz et al. ............. | 219/617 |

* cited by examiner

Primary Examiner—Philip H. Leung
(74) Attorney, Agent, or Firm—Barlow, Josephs & Holmes, Ltd.

(57) ABSTRACT

An energy storage system for use in a magnetic pulse welding and forming apparatus includes a bank of capacitors and a very-low inductance conductive bus system interconnecting the capacitors. The bus system provides the ability to generate a very high frequency, short duration impulse which is needed for welding. The energy storage system further includes an energy source connected to the capacitors, a discharge device, a charging control device, and a discharge control device for selectively initiating discharge of energy stored in the capacitors. Inductor tools used in connection with the energy storage system are split to allow parts to be welded to be easily mounted into and removed from the inductor tools. One part of the split inductor tool is either rotatable or slidably movable relative to a fixed part of the inductor.

16 Claims, 8 Drawing Sheets

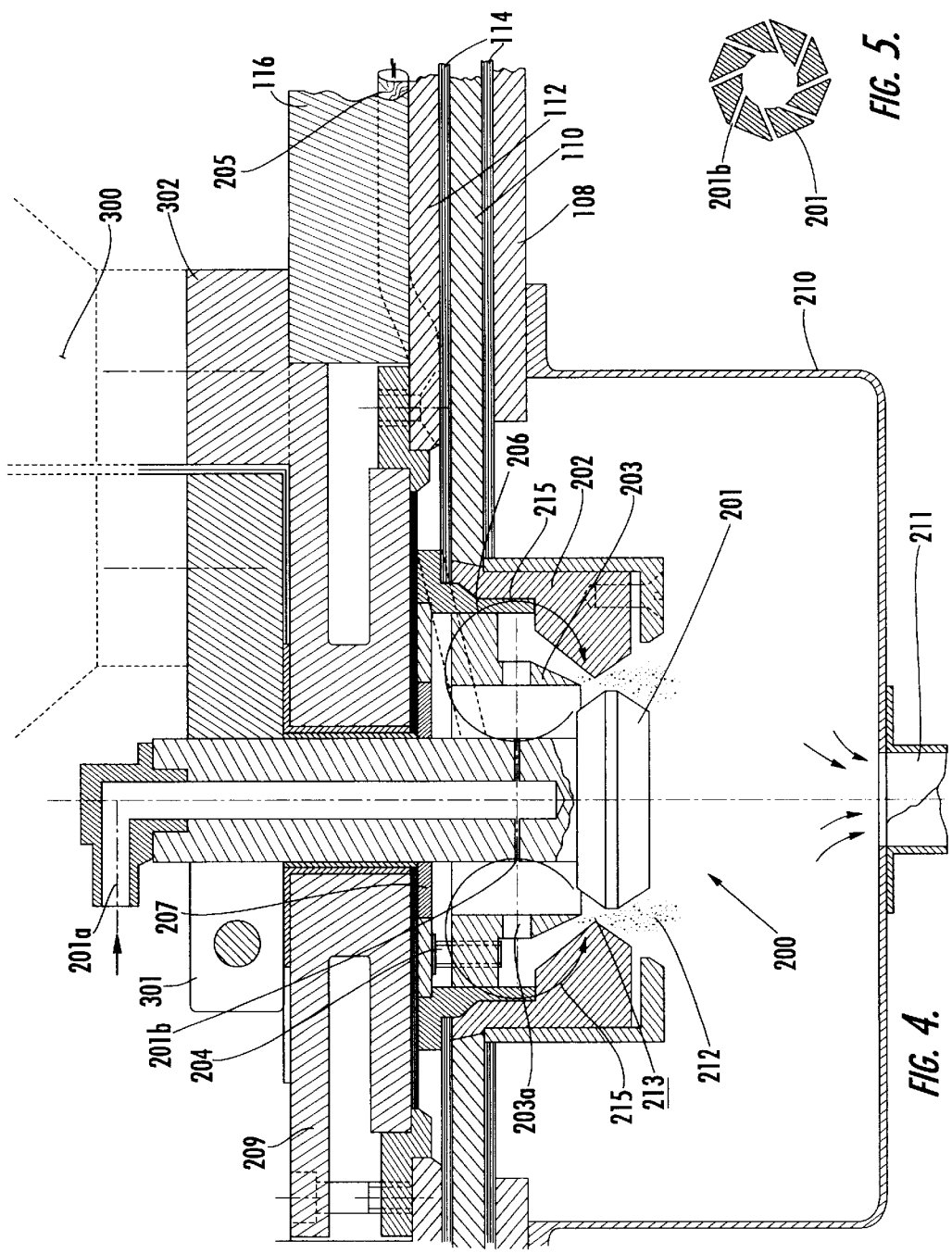

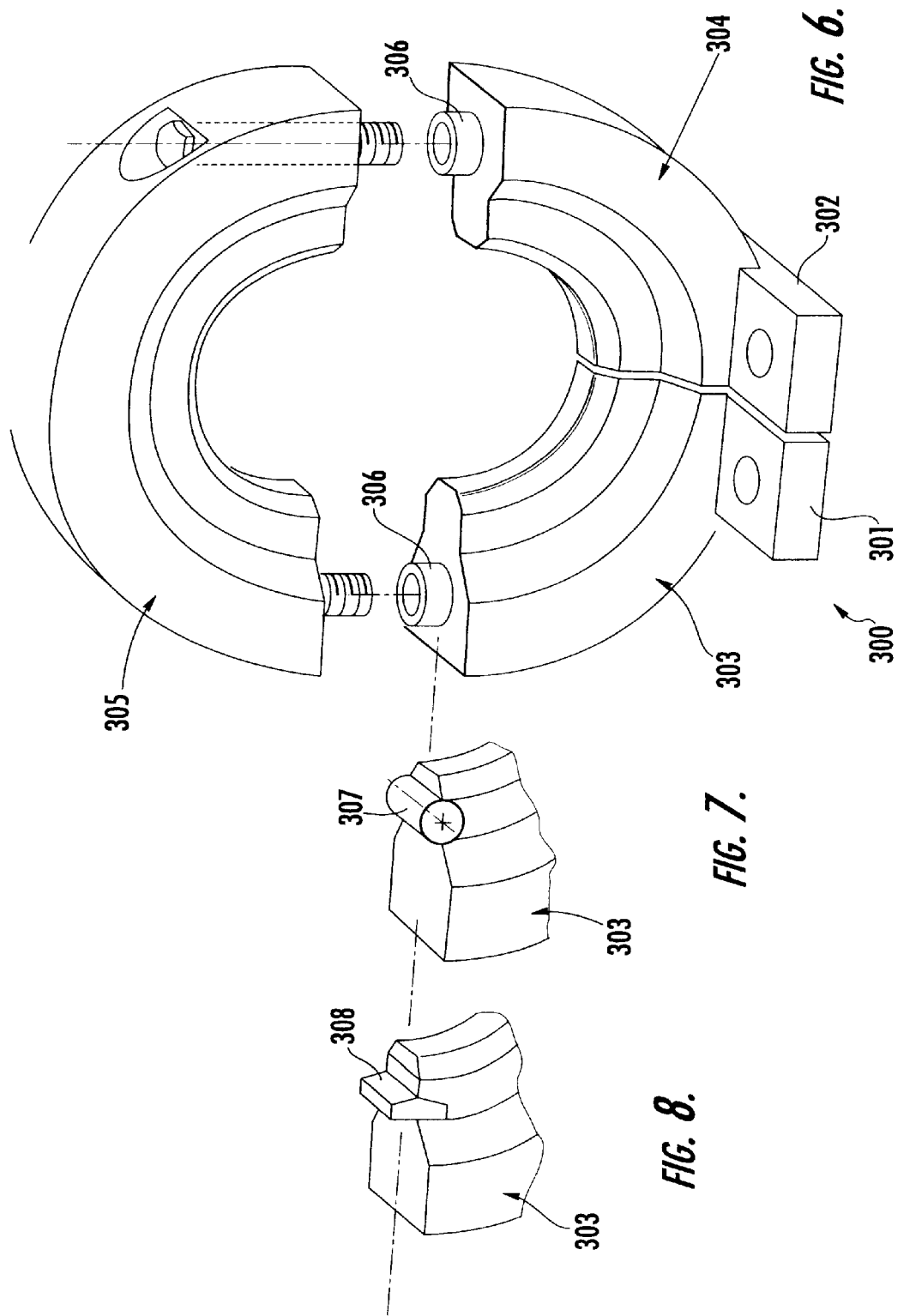

ENERGY STORAGE APPARATUS AND INDUCTOR TOOLS FOR MAGNETIC PULSE WELDING AND FORMING

CROSS-REFERENCE TO RELATED APPLICATIONS

This application is a continuation-in-part of U.S. patent application Ser. No. 09/517,958, filed Mar. 3, 2000 now U.S. Pat. No. 6,400,538.

BACKGROUND OF THE INVENTION

The instant invention relates generally to magnetic pulse welding and forming, and more particularly to an energy storage apparatus for storing and supplying a high frequency working impulse to a magnetic pulse inductor.

In the automotive industry, there are many tubular parts that need to be coaxially joined and/or end fittings that need to be joined to tubular components. Magnetic pulse forming devices have been used in the past to accomplish this purpose. However, the results achieved in the prior art devices have not always been of high quality and thus not acceptable in many applications.

Magnetic pulse devices store energy within a bank of capacitors and release the energy through an inductor coil (welding tool) that creates a magnetic force strong enough to collapse the components positioned within the inductor coil. In this regard, tubular components are pre-assembled and positioned within the center of the inductor. The energy released through the inductor coil generates a magnetic field strong enough to collapse the outer tube inwardly into engagement with the inner tube. When used to connect an end fitting, the outer tube is collapsed onto the outer surface of the end fitting. If the energy stored in the bank of capacitors is enough, the inward collapsing velocity will be sufficient to cause the metal of the outer component to penetrate the metal of the inner component forming a full metallurgical bond between the components in what is referred to as "cold stage welding".

Methods and apparatus for Magnetic Pulse Welding are described in "Handbook of Magnetic Pulse Treatment of Metals", by Kharkov, Kharkov State University, 1977 (Translated into English and edited by Ohio State University in 1996 by M. Altynova, and Glenn S. Daehn), and in the book "Magnetic Pulse Welding of Metals", by A. A. Dudin, Moscow Metallurgy, 1979.

Other methods and apparatus for this process have been described in the following articles: "Magnetic-Pulse Welding: Unique Concept for Tubing Components", by D. Dudko, V. Chudakov, L. Kistersky and T. Barber, *Proceedings of the Eleventh Annual World Tube Congress*, Rosemont, Ill., Oct. 9–11, 1995; "Welding Process Turns out Tubular Joints Fast", by L. Kistersky, *American Machinist*, April 1996; and "Magnetic Pulse Welding of Tubing", by D. Dudko, V. Chudakov, L. Kistersky and T. Barber, *The Fabricator*, September 1996. The U.S. Pat. No. 3,520,049 to Lysenko et al also describes similar subject matter.

The prior inventors of magnetic pulse welding apparatus generally did not pay attention to the fact that the quality of the welding joint is dependent, not only on the velocity of the impact and so on the amount of the energy released, but also more importantly, on the duration of the impulse current realizing this energy. In this regard, the same volume of energy released in impulses of different duration will cause different types of metallurgical joints in the same parts. Longer duration (lower frequency) impulses will cause only a simple deformation, whereas a very short duration (high frequency) impulses will cause a full metallurgical weld.

It is now desirable to be able to use this method to obtain welding of tubular components that are made of stronger materials, and that have thicker walls. However, the existing magnetic pulse welding devices have generally not been able to provide a full metallurgical weld between such components. This problem has resulted from the fact that virtually all of the known apparatus for magnetic pulse welding and forming have included generally the same construction and configuration. The key factor for improving the weld in high strength materials and across thick materials has not yet been fully identified in the prior art. Some work has been focused on releasing more energy and on changing the pre-assembled configuration of the parts to achieve better welding. For example, see the U.S. Pat. No. 5,981,921 to Yablochnikov. This patent deals with a method of assembling an end fitting with a tube for a driveshaft. The specification clearly points out that the quality of the metallurgical joint for the material was independent from the Magnetic Pulse unit (column 2, lines 30–35), and the physical reason why a strong metallurgical joint between the components could not be obtained using the known magnetic pulse units was "not known yet".

SUMMARY OF THE INVENTION

The instant invention seeks to provide an answer to the problem. According to the present invention, the quality of the metallurgical joint produced via magnetic pulse welding is a combined function of the velocity of collapsing of the component, and the duration of the initial current impulse. The velocity of the collapsing is derived from the force of repelling (density of the magnetic field), weight of the portion to be collapsed, mechanical strength of the metal to be collapsed, the distance (gap) between the collapsing end of the outer tubular component and the surface of the inner component. Usually, this factor is figured out experimentally by finding of a range of proper gaps between components to be welded for a defined pair of materials using a predetermined level of initial impulse current through a chosen inductor. The proper combination of a gap, impulse current and inductor design usually is a result of an experimental program. A more controlled quality of the magnetic-pulse welded joint can be achieved when a definite collapsing angle is provided. This collapsing angle is a dynamically created angle at the point of touching of the inner component surface by the collapsing portion of outer component. It is known from another method of welding via impulse pressure, i.e. explosion welding, that for a given pair of metals, a fully developed weld joint will occur only when the correct collapsing angle is provided. ("Explosion Welding in Metallurgy", 168 pgs., Kuclinov, Koroteev, Moscow, "Metallurgy", Series "New Processes of Welding via Pressure", 1978). For explosion welding, this angle is derived from the force developed during the explosion of the explosive material. For magnetic-pulse welding, the collapsing angle is dependent on the duration of initial impulse. To be able to vary and to control the velocity of collapsing produced by the magnetic pulse welding apparatus, the level of maximum voltage is controlled, as well as reliability of discharger to produce a current impulse at the predetermined moment, and the gap between the components to be welded. Further control of the collapsing velocity can be achieved by developing a special geometry of pre-assembled components (pre-weld design). In particular, a fixed angle between the outer component and the surface of inner component is maintained. Research has proved experimentally that a better quality of joint is obtained when using a definite fixed angle. But the most important factor that determines the collapsing angle is the duration of initial impulse, and more specifically, the duration of the first quarter of the initial current impulse.

To be able to vary the above mentioned collapsing angle widely and to find an optimum collapsing angle for the defined pair of metals and alloys to be welded, the frequency of initial impulse should be variable and adjustable. This frequency is dependent on several factors: (1) the self inductance of the apparatus (La), which is constant for each design and each geometry of devices included the apparatus along with their connections; (2) the capacity of the battery of capacitors ($C_{1-N}$), which is usually constant for every magnetic pulse welding unit, and which usually cannot be changed in practice beside of total reconfiguration of unit; (3) the inductance of inductor (Li), which is higher for multi-coil inductors and lower for one coil inductors; and (4) finally is dependent on the resulting L, C and R of the combined system.

None of the known prior art apparatuses for magnetic-pulse welding are capable of changing the frequency of the initial impulse. Moreover, the frequency of most of the existing devices is not optimal for use with the types of metals currently utilized in industry. This is especially true for automotive applications, where aluminum alloys having high mechanical strength are to be joined with steel fittings. These types of applications require high frequency impulses with extremely short duration (about 10 microseconds or less). Almost all of the known magnetic- pulse welding apparatus, especially those equipped with multi-coil inductors having high self inductance, function outside of the optimal duration of the initial impulse. Still further, these existing apparatus use relatively low voltage capacitors having a high self-inductance. In this regard, to increase the energy of the impulse and the velocity of collapsing these devices have to use a large battery of capacitors, which leads to a decrease of frequency of the initial impulse. This is the reason why these apparatus do not provide a high strength weld even though they do release a high energy level to increase the velocity of collapsing.

There is therefore a need to provide a magnetic-pulse welding apparatus capable of varying and controlling the above described critical parameters. Such an apparatus will be able to optimize the velocity of collapsing and the collapsing angle by providing a controlled adjustable initial impulse current of required amplitude and duration. Part of this functionality is provided by an energy storage system that utilizes high-voltage, low inductance capacitors, and a very-low inductance conductive bus system directly interconnecting the capacitors, a discharger and an inductor. The bus system provides the ability to generate a very high frequency, short duration impulse, which is needed for high quality welding of high strength metals. The bus system includes first, second and third flat bus panels disposed in closely spaced overlying relation. The second, or middle, bus panel is the "high voltage" or "hot" bus and is electrically insulated from the first (lower) and third (upper) bus panels (ground bus panel) by sheets of electrically insulative material. The first and third bus panels are connected together cooperatively form a unitary ground bus. The bus system overlies the upper ends of the capacitors wherein the second bus panel is electrically interconnected to the respective hot contacts of the capacitors, and further wherein the ground bus is electrically interconnected with the respective ground contacts of the plurality of capacitors. The energy storage system further includes an energy source connected to the capacitors, a discharge device, a charging control device, and a discharge control device for selectively initiating discharge of energy stored in the capacitors. The bus system further includes removable connector elements that are selectively removable for controlling the total number capacitors utilized in the energy storage bank, thus being able to control the total voltage and also the duration of the initial impulse.

Another part of this functionality is provided by special inductor tools that are adapted for high energy pulse welding as well as for ease of use in a high volume manufacturing environment. In this regard, the invention provides several different embodiments of inductor tools that permit one portion of the inductor tool to be fixed in a stationary position on the energy storage apparatus and another part to be movable so that the pieces to be formed can be easily mounted into and removed from the inductor tool. In this regard, the inductor tools provide a high quality electrical contact at the junction points between the mated pieces of the inductor tools.

Accordingly, among the objects of the instant invention are: the provision of an energy storage system for a magnetic pulse unit wherein the energy storage system utilizes a low inductance bus system for creating a high frequency, short duration impulse; and the provision of special inductor tools that permit parts to be welded to be easily mounted in and removed from the inductor tools in a high volume manufacturing environment.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 4 is an enlarged cross-sectional view of the discharger;

FIG. 5 is a cross-sectional view of the central electrode;

FIG. 6 is a perspective view of a split inductor for use with the energy storage system;

FIG. 7 is a fragmentary perspective view of one type of end fitting for the split inductor;

FIG. 8 is a fragmentary perspective view of another type of end fitting;

DESCRIPTION OF THE PREFERRED EMBODIMENT

Figure 1:
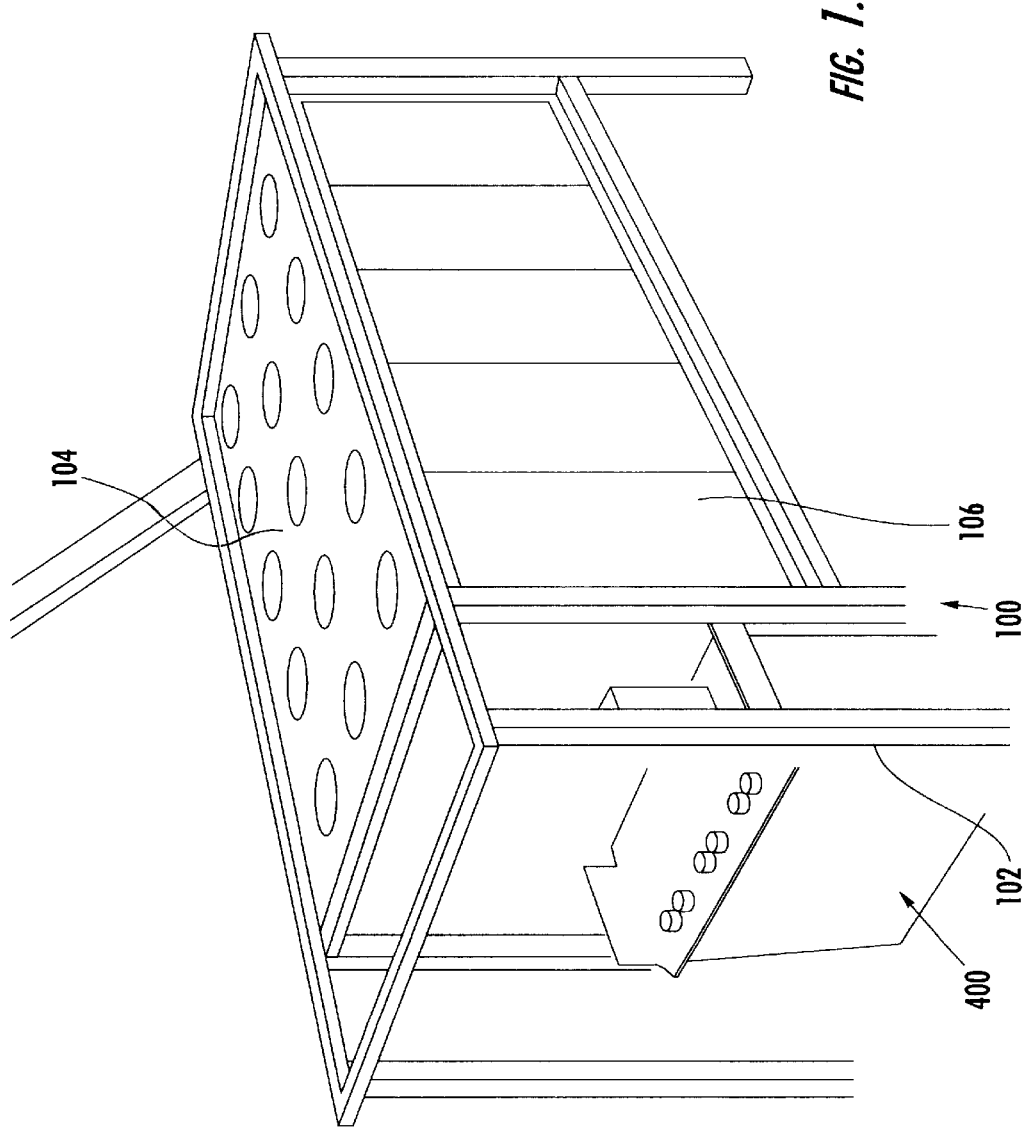
FIG. 1 is a perspective view of the energy storage apparatus of the present invention.

Referring first to the FIGS. 1–8, a magnetic pulse welding apparatus in accordance with the teachings of the instant invention is illustrated and generally indicated at 100 in FIGS. 1–8.

The apparatus 100 includes a frame generally indicated at 102, a connective bus system generally indicated at 104, and a bank of high voltage capacitors with low self inductance, generally indicated at 106. The system further comprises a discharger, indicated generally at 200, an inductor tool generally indicated at 300, a high voltage source of energy generally indicated at 400, and a control system generally indicated at 500.

The high voltage capacitors 106 are of the type that can provide a high voltage charge/discharge of 5 kV or more. The capacitors 106 have a "high voltage" or "hot" contact 128 and a ground contact 124. The term "hot" is utilized for the contact 128 because the polarity of the contact could be either positive or negative. Capacitors 106 of the type contemplated are commercially available from power supply vendors.

The high voltage source of energy 400 comprises a high voltage transformer-rectifier that is designed to charge the bank of power capacitors 106 in a short time period and is further designed so that it does not require disconnection during the discharge cycle. Transformer-rectifiers of the type contemplated are commercially available from various power supply vendors.

The control system indicated generally at 500, is responsible for controlling charging of the capacitors and release of the current impulse at a predetermined moment.

The inductor tool 300 comprises a removable inductor coil, i.e. welding tool, which Is generally one-coil inductor, solid or split, depending on the components to be welded.

Figure 2:
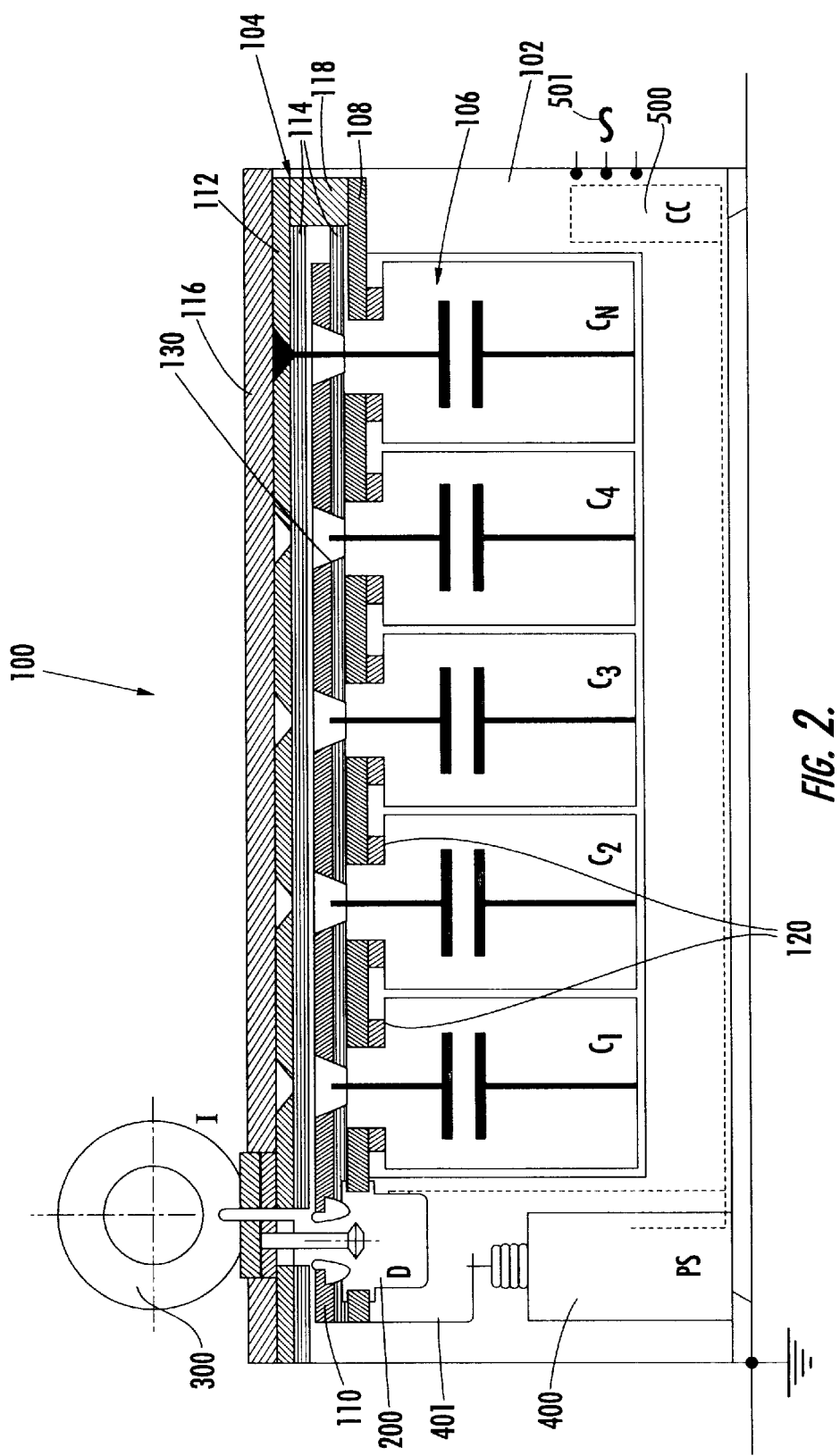
FIG. 2 is a cross-sectional view thereof.
Figure 3:
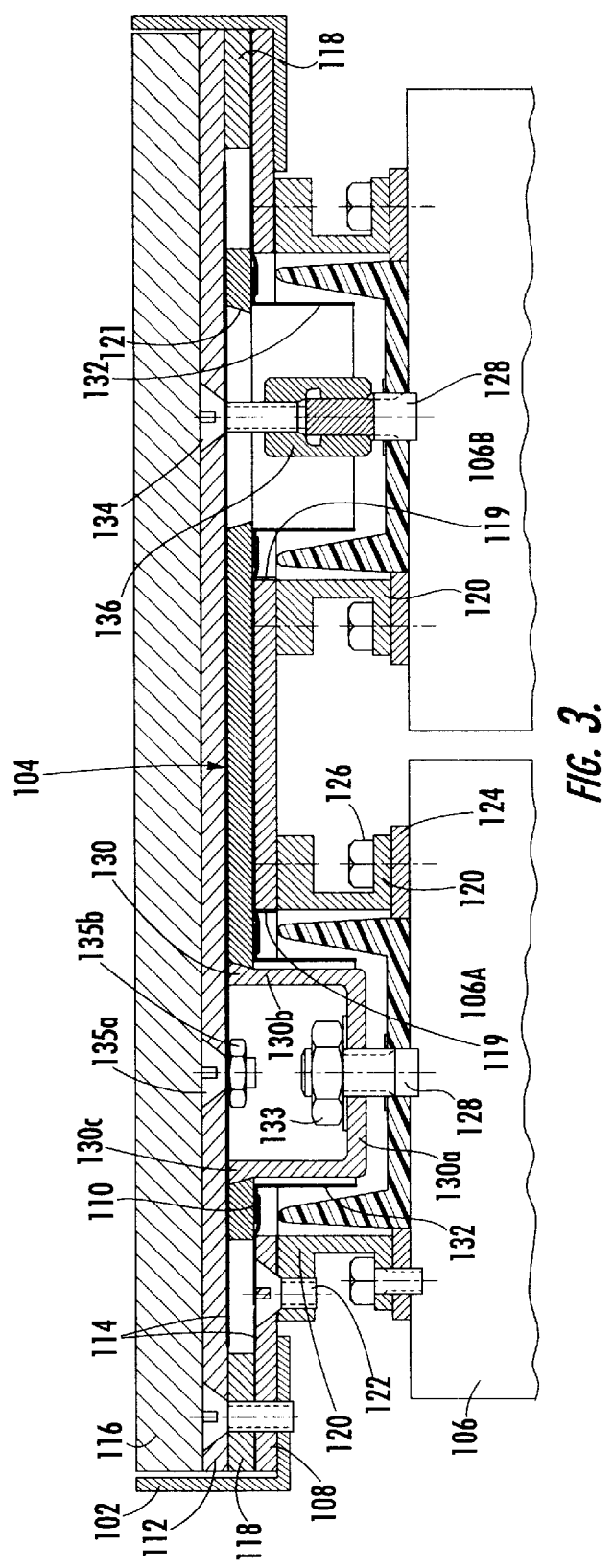
FIG. 3 is an enlarged cross-sectional view of the connector elements for selectively connecting the capacitors to the bus system.

Referring to the drawings in FIGS. 2 and 3, the connective bus system 104 and means for selectively connecting and disconnecting the capacitors 106 is illustrated. The bus system 104 consists of the three bus panels: a bottom bus panel 108, a middle bus panel 110, and an upper bus panel 112. The middle bus panel 110 is isolated from the top and bottom bus panels 108 and 112 by sheets of multilayer electrically insulative material 114. More specifically, the multilayer isolative sheets 114 are placed on top of the bus panel 108 and under bus panel 112 respectively to electrically isolate "hot" middle bus panel 110 from the surrounding components. The top bus panel 112 is covered with exterior electrically isolative plate 116.

The bus system 104 is designed to conduct a high current and high frequency working impulse of a predetermined duration directly from the battery of capacitors 106 to the inductor tool 300 at the moment of initiation of a working impulse by the discharger 200. The bus system 104 is believed to define a new element according to the current Invention. The bus system 104 is designed to have a minimal active resistance and inductive resistance, so that energy from the battery of capacitors 106 will be directly transferred to the working tool with minimal loses. Also bus system 104 shortens the total physical distance between the inductor tool 300 and the discharger 200 and minimizes the geometrical dimensions of connective buses. The bus system further provides the ability to control the duration of working impulse via connection or disconnection of desirable quantity of capacitors 106 depending on the components to be welded. For the above mentioned purposes the top bus 112 and the bottom bus 108 are made of highly conductive materials, for example aluminum or copper, and they have a sufficient thickness and mechanical strength to support the bus system 104. The upper and lower pus panels 108 and 112 are connected to each other using connective metal strips 118, which extend along the frame 102 of the unit 100. These strips 118 electrically interconnect the upper and lower bus panels 108 and 112 together to collectively form a ground bus. The bottom bus panel 108 includes a plurality of openings 119 that are arranged in corresponding relation to the contacts at the upper ends of each capacitor 106. The middle bus panel 110 also includes a plurality of openings 121 in the same arrangement.

The ground bus panels 108 and 112 are grounded to the capacitors 106 by grounding rings (connectors) 120 which are bolted to the bottom bus panel 108 (bolt 122) and to a ground panel 124 (bolt 126) on the upper end surface of capacitors 106 simultaneously. The rings 120 surround the openings 119.

Referring to CAPACITOR 106A of FIG. 3, the central—high voltage—contact 128 of the capacitor 106A is connected to the "hot" bus panel 110 by tapered connector cup 130, which is seated in the opening 121 in the middle "hot" bus 110. The connector cup 130 has a bottom wall 130a and a continuous side wall 130b. The peripheral lip 130c of the cup 130 is tapered and engages with the tapered sidewalls of the openings 121. The cups 130 extend through the openings 119 in the bottom bus panel 108 and through openings in the insulator materials 114. A nut 133 threads onto the contact 128 and forces the lip 130c of the cup 130 downwardly into engagement with the sidewalls of the openings 121 in the bus panel 110. Insulator rings 132 are seated within the top of each capacitor 106 to center the openings of isolative sheets 114 and to prevent accidental discharge, including corona discharge over the surfaces of the parts of the capacitors, between the high voltage contacts 128 of the capacitors 106 and the connector cups 130 and ground plates of the capacitors. Plastic fasteners 135a and 135b are fitted into openings in the ground panel 112 to fill the openings. All capacitors 106 which are to be utilized for charging are connected in this manner.

Referring to capacitor 106B of FIG. 3, there is provided a grounding mechanism for selectively grounding individual capacitors 106 so that they are not charged by the system. In this regard, the connector cup 130 is replaced by a metal bolt 134 that is threaded downwardly through an opening in the upper bus panel 112 and into engagement with the hot contact 128 of the capacitor to ground the capacitor. The threaded bolt 134 is surrounded by a plastic insulator tube 136 to prevent accidental discharge. This arrangement selectively isolates the capacitor 106B and allows the operator to selectively control the voltage, current and frequency of the current impulse released.

The discharge device 200 is illustrated in FIGS. 4 and 5. According to the current invention, the discharger 200 comprises a central electrode 201 placed coaxially inside of ring electrode 202 with an adjustable concentric gap in between. The discharger 200 further includes an ignition electrode 203 designed as a coaxial ring surrounding central electrode 201. The ignition electrode 203 can be moved up and down with respect to the central electrode 201 and placed in a definite position by means of an adjusting bolts 204. The ignition electrode 203 is connected to the independent source of igniting impulses (not shown on FIG. 2) by an ignition cable 205. The ignition electrode 203 is electrically isolated from the ring electrode 202 with the help of a dielectric sleeve 206 and from the central electrode 201 with the help of dielectric sleeve 207. Central electrode 201 has opening 201a for the input of compressed air which is passed through to tangential jets 201b for organizing air flow through the discharge gap. Discharge electrode 203 includes radial openings 203a for further organizing air flow.

Ring electrode 202 is mounted to the middle bus 110 and the central electrode 201 is connected to one leg 301 of the inductor tool 300. The other leg 302 of the inductor tool 300 is connected to the top bus panel 112 by means of a connective ring 209. A discharge enclosure 210 is mounted on the bottom bus 108. The enclosure 210 has a hermetic joint with the bottom bus 112 and an outlet 211 for exhausted air containing the ozone and drops of the electrode's metal after the working cycles.

In use, the apparatus functions as follows: at the moment of connecting "Start" button ("S" 501 in FIG. 2) transformer-rectifier 400 is switched to connect with the middle "hot" bus 110 and thus to the battery of capacitors 106 to start charging the capacitors 106. The voltage on the ring electrode 202 thus rises respectively. Controlled discharge according to the present invention works as follows: as soon as the voltage on the battery of capacitors 106 reaches a chosen level, discharge will be ready to occur between the central electrode 201 and the ring electrode 202. The discharge gap between these electrodes should be adjusted so that the working voltage cannot automatically generate a direct arc between these electrodes. Instead the ignition electrode 203 is positioned in between the working electrodes 201 and 202 in such a way that the distance between it's edge and one of the working electrodes 201 or 202 is much less than the discharge gap. For example, discharge gap for a working voltage of 15 kV should be not less then 5 mm (having in mind that direct arc through an air gap about 1 mm long occurs for voltage 3 kV). The distance between the ignition electrode's edge and one of the working electrodes 201 or 202 can be chosen to be 2–3 times less, or 1.5–2 mm. Ignition of the between the ring and central electrode is created by generating a separate discharge through the ignition electrode 203. In other word, the ignition electrode 203 provides a spark to jump the discharge gap. Ignition voltage from an independent source of impulse current (not shown on FIG. 3) is about 25–30 kV. Accordingly, the ignition impulse will develop an arc between the electrodes 201 and 202 and a respective plasma jet 212 will be formed.

To provide a high quality discharge of energy from one electrode to the other electrode the plasma jet 212 must be controlled. In this regard, a tangential air jet from the central electrode's openings 201b forces air flow towards the discharge gap and creates favorable conditions for an instant working discharge 213 and for developing a powerful working impulse current through the inductor coil 300. The main distinctive features of the discharger according to the present invention are the follows: the prior art spark dischargers have the working electrodes 201 and 202 and the ignition electrode 203 placed relatively close to each other in such a way that at the moment the working discharge is released, the plasma jet moves towards ignition electrode (See, for example U.S. Pat. No. 4,990,732).

According to electrodynamics law, the plasma jet 212 will normally stray out of the desired current contour. In other words, the plasma jet moves in a direction away from the current contour. In this prior art, this problem has led to overheating of the ignition electrode 203, intensive erosion and distortion of ignition electrode 203 and, finally, leads to an uncontrolled working discharge 213. The new design of the discharger device 200 arranges the phenomenon of plasma jet 212 in such a way that the ignition electrode 203 is placed inside of the current contour (see arrows 215) and such that it will never be in the path of the plasma flow, and so will never be overheated or bombarded by the plasma jet 212. In this case, the ignition electrode 203 is not eroded, and thus maintains it's exact geometry and it is not required to adjust the ignition electrode 203 with respect to the working electrodes 201, 202, nor is it necessary to replace the ignition electrode 203 as often. Accordingly, the life time of ignition electrode 203, as measured by the quantity of working cycles before it's replacement, should be significantly increased.

As indicted above, the present design organizes the flow of cooling air in the area of working discharge. This design feature is not believed to be shown in any of the known prior art. The invention accomplishes this by providing two types of openings; (1) tangential openings 201b in the central electrode 201 (See FIG. 5); and (2) radial openings 203a in the discharge electrode 203. These openings 201b and 203a organize the air flow in such a way that two distinct air flows occur: (1) the first is between the ignition electrode 203 and the central electrode 201; and (2) the second is between the ignition electrode 203 and the ring electrode 202. The optimal parameters for both flows are reached by changing the gaps between these electrodes. Both gaps facilitate the working discharge by forcing the plasma jet impulse 212 towards the gap between working electrodes 201 and 202.

As soon as the main working current impulse is created, a powerful pulse current—about 500,000 Amps or more—travels from the battery of capacitors 106 through the low inductance current bus 110, through the inductor coil 300 and buses 108, 112 to the ground. The respective inductive current, in the opposite direction, is produced in the outer tubular components, placed within the magnetic field of the inductor 300. The interaction of the initial current impulse and the secondary inductive current impulse causes a massive repulsive force and a resulting inward impact of the outer components into the inner components with a high velocity. If the velocity and a collapsing angle are optimal for the chosen pair of metals, the metal of outer component penetrates the metal of the inner component thus creating a full metallurgical bond at the molecular level.

The above described working cycle can be repeated every second, or every few seconds, depending on the time needed for cooling of the discharger 200. This timing is very critical for the productivity of MPW apparatus 100. Dependent on the application, different types of inductor tools 300 could be connected to the MPW apparatus 100. For example, a solid coil inductor for components having a maximum outside diameter less than the inductor opening, or a split coil inductor for complicated shape components which can not be removed out of inductor after welding (for example for drive shafts with end yokes having an outer diameter more than the tube OD), or a multi-coil inductor with a long working zone for forming applications.

Referring now to FIG. 6, the above described MPW apparatus 100 is particularly suitable for use with a split inductor 300. The split inductor 300 generally includes two quarter-coils 303, 304 each having connective legs 301, 302 and one semi-coil 305. The general construction of the inductor coil is known in the art. The coils 303, 304, 305 are interfittingly engaged and aligned together with special mechanical contacts 306. The quarter-coils 303, 304 are connected through feet 301 and 302, to the apparatus 100 constantly, and the semi-coil 305 is a movable, or removable, part, which is selectively connected to and disconnected from the respective ends of quarter-coils 303, 304 during each working cycle. The semi-coil 305 can be articulated by using a variety of different mechanical means, such as air pressure cylinders, or manual bolts dependent on productivity requirements for loading and unloading operations. Design of the electrical contacts 306 on the respective interface ends of coils 303, 304, 305 is critically important for effective work of split inductor 300. The most important criteria are geometry of electrical contact and average of pressure on contact surface. In this regard, the average contact pressure between the electrical contact surfaces should be no less than 1 kg/sq.mm and more preferably no less than 2 kg/sq.mm. Referring to FIGS. 7 and 8, to reach an optimal quality of electrical contact, the quarter-coils 303, 304 are designed with contact inserts 307, and 308 respectively. Referring to FIG. 7, a cylindrical insert 307 is shown, and referring to FIG. 8, a wedge insert 308 is shown. These inserts facilitate the necessary contact pressure to be applied to the interface, and insure the proper contact between the separate parts of the inductor.

For industrial inductors that need to work at a high productivity rate during extended periods of time, the inductor can alternatively be provided with channels (not shown) for circulation of cooling water or cold air.

EXAMPLE

The following represents an example of a successful application of the apparatus 100 for Magnetic-Pulse Welding of a metallurgical joint between a mild steel end fitting (driveshaft yoke) with an aluminum tube grade Al6061, T-6 (driveshaft tube).

The components to be welded have the following characteristics. The annular locating ring (width "W") on the cylindrical neck of the fitting (driveshaft yoke) was sized so that an interference fit exists between the outer surface of the locating ring and the inner surface of the tube ( driveshaft tube). The tube stop was located a distance "L" and it was sized so that, when a trimmed, the orthogonal tube end is placed fully in contact with tube stop, and a closed cavity between the inner surface of the tube and the outer surface of the fitting was created. The depth of the cavity was chosen experimentally for the said metals to be welded and depended on the predetermined initial angle "a" of a generally tapered bottom of the cavity. The initial distance "I" between the bottom of the cavity and the inner surface of the tube on the very end may be varied depending on critical parameters of the predetermined cavity shape "L".

The critical parameters of the predetermined cavity shape for the above pair of components in case of having standard Al tube OD13.5" (or 88.9 mm+0.1 mm) wall thickness T=2.2 mm'+/−0.1 mm and a pre-machined steel end fitting with the annular locating ring OD2=84.5±0.1 mm. For this pair of metals with above initial shape of components to be welded: L=12 mm+/−1 mm; and a=7+/−0.5 mm. The width of the annular locating ring was generally W=10 mm. The initial distance between the bottom of the cavity and the inner surface of the tube on the very end was varied: I=0–0.5 mm. The radius R=2 mm; and the chamfer C1=2 mm.

The chosen configuration of the apparatus 100 provided a bank of 12 capacitors in parallel, each having a capacitance of 12 uF for a total capacitance144 uF. The voltage from the discharger on a single-turn coil split inductor was 16,800 V, which was allowed to energize the split inductor with the short impulse of current about 500,000 amps. The pre-assembled components as described above were placed in position within the working zone of the split inductor 300 connected to the apparatus 100. The second half of the split inductor was closed over the assembly and the impulse of current was discharged through the inductor. The current impulse was sufficient to cause a high velocity collapse of the outer tube onto the end fitting and cause material of the outer tube to penetrate the metal of the steel end fitting to create a full metallurgical joint at the molecular level. The resulting components were tested for mechanical strength and fatigue cycles and were proven to be within the limits acceptable for practical application for automotive industry.

Figure 9:
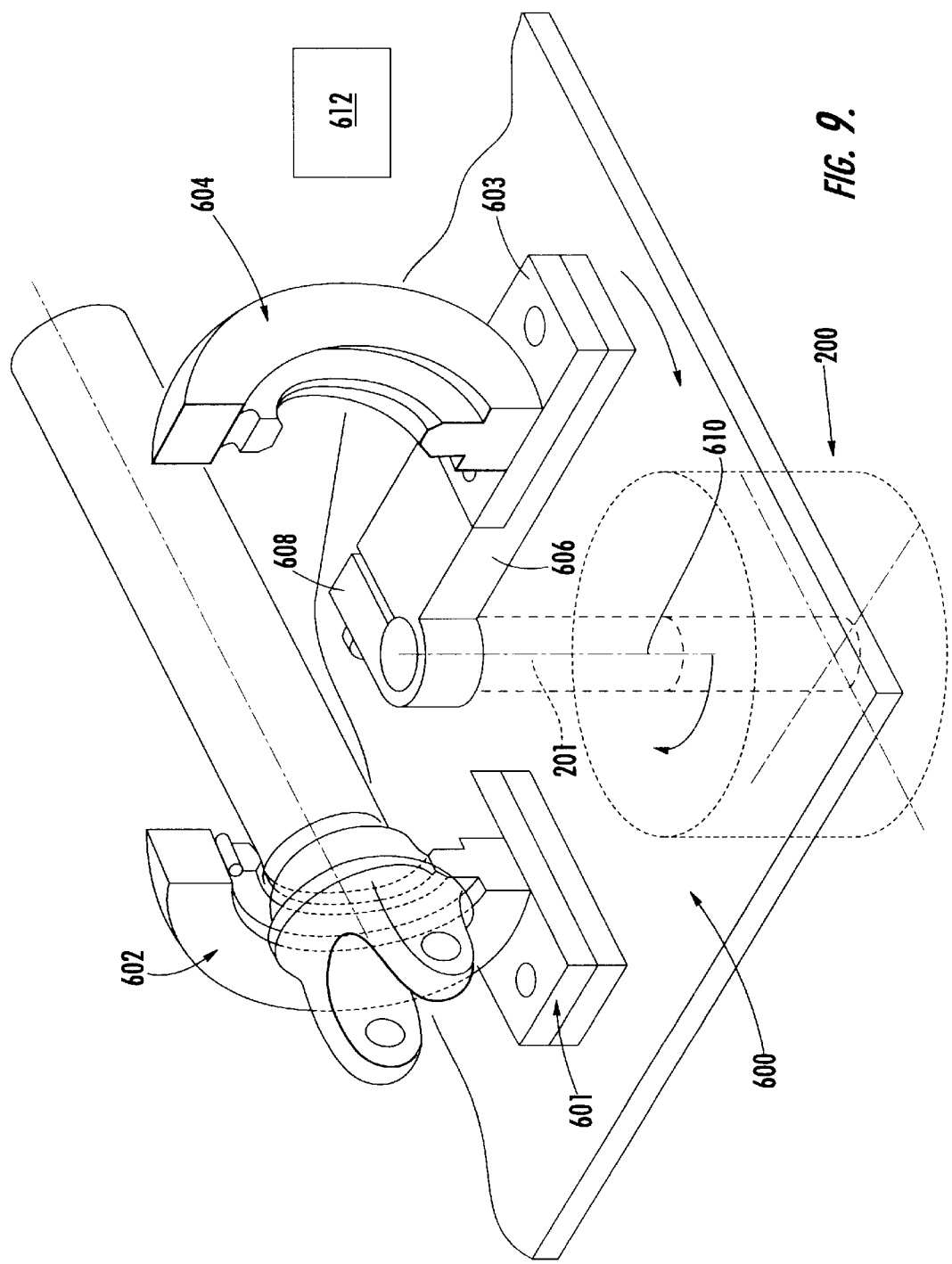
FIG. 9 is a perspective view of an alternative embodiment of a split inductor for use with the energy storage system.

Turning to FIG. 9 and alternative embodiment of the above described MPW apparatus 100 is disclosed using a rotatable split inductor 600. The rotatable split inductor 600 generally includes two semi-coils 602, 604 each having connective legs 601, 603. The semi-coils 602, 604 are connected to the apparatus 100 through contact feet 601 and 603. Semi-coil 602 is connected in a fixed position to the apparatus 100 constantly while semi-coil 604 is mounted on an arm 606 connected to the central electrode 201 of the discharge assembly 200 at its upper section. The arm 606 is clamped to the central electrode using a mechanical clamp and bolt arrangement as generally indicated at 608 in the drawing. In this regard, the central electrode 201 is rotatable along axis 610 with respect to the bus panels 108 and 112 through which it passes (not shown in FIG. 9). In use, semi-coil 604 is rotated into place and is interfittingly engaged and aligned together with the fixed semi-coil 602 and is selectively connected to and disconnected from the respective ends of semi-coil 602 during each working cycle by rotating the discharge electrode assembly 200. As can be seen in FIG. 9, the inductor coils include contact inserts as described hereinabove. The semi-coil 604 can be articulated by using a variety of different mechanical means, such as air pressure cylinders generally indicated at 612, or motors dependent on productivity requirements for loading and unloading operations.

Figure 10:
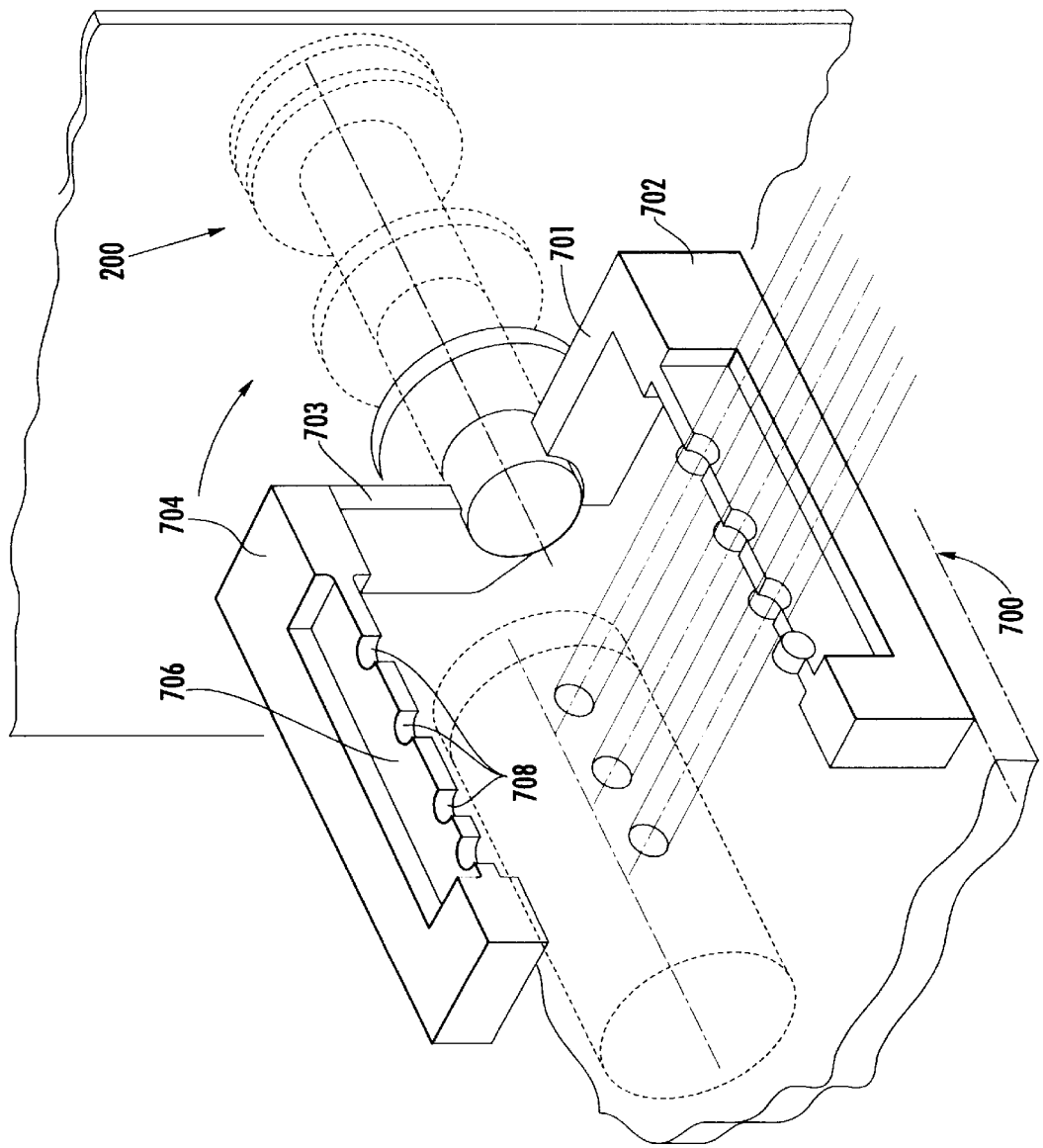
FIG. 10 is a perspective view of a second alternative embodiment of a split inductor for use with the energy storage system.

Turning to FIG. 10, a second alternative embodiment of the inductor assembly 700 for the above described MPW apparatus 100 is shown. The rotatable split inductor 700 of this embodiment also includes two semi-coils 702, 704 each having connective legs 701, 703. The semi-coils 702, 704 are connected through feet 701 and 703. Semi-coil 702 being connected in a fixed position to the apparatus 100 constantly and semi-coil 704 is mounted to the central electrode 201 of the discharge electrode assembly 200 at its upper section. Semi-coil 704 is rotated into place and is interfittingly engaged and aligned together with the fixed semi-coil 702 and is selectively connected to and disconnected from the respective ends of semi-coil 702 during each working cycle by rotating the discharge electrode assembly 200. Although the general construction of the inductor coil is similar to those noted above, the inductor coil contact section 706 is formed so as to have a multitude of openings 708 into which several of the parts to be joined can be loaded, thus allowing an increase in productivity by allowing more than one part to be joined per single MPW cycle. The semi-coil 704 can be rotated by using a variety of different mechanical means, such as air pressure cylinders, or motors dependent on productivity requirements for loading and unloading operations.

Figure 11:
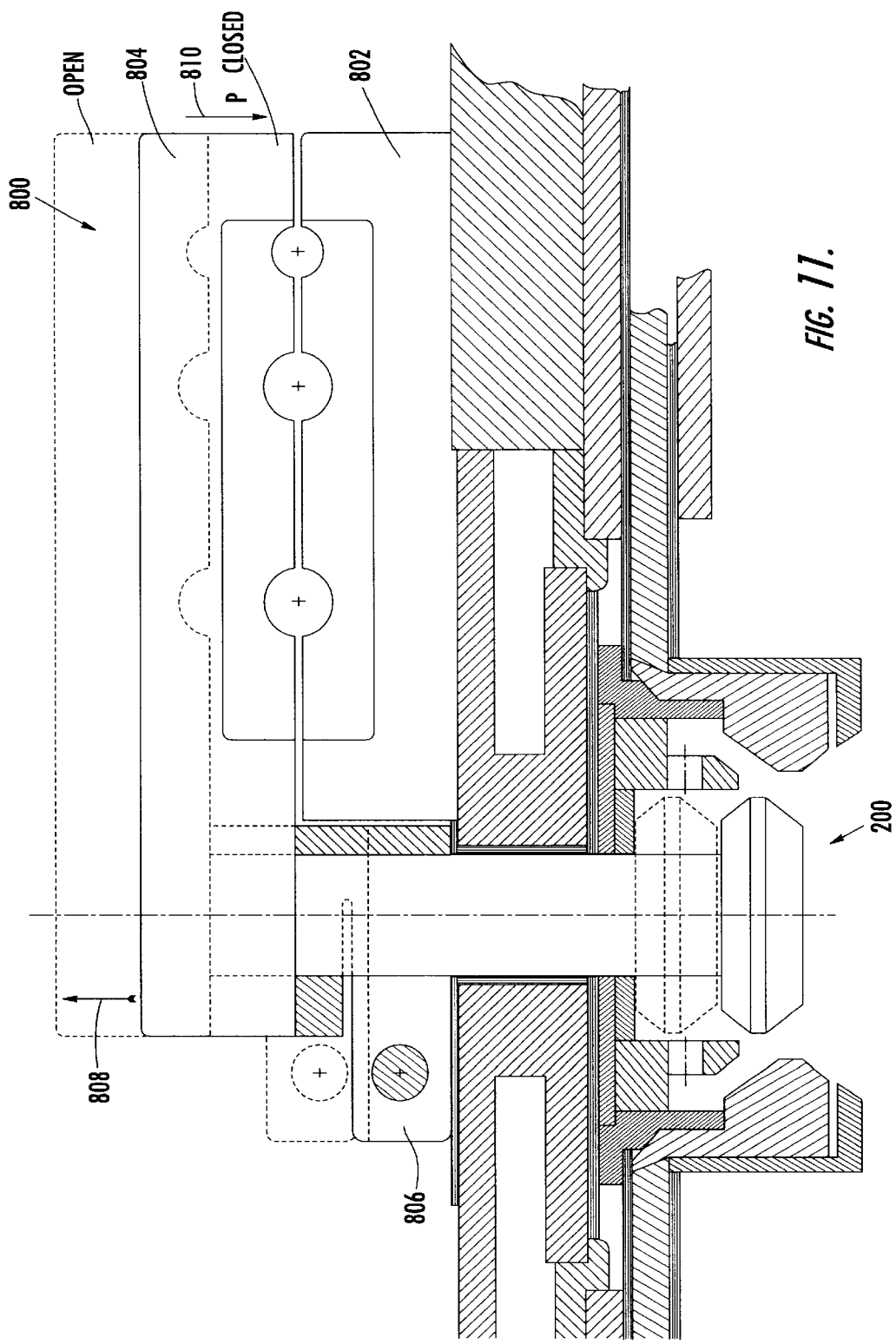
FIG. 11 is a perspective view of a third alternative embodiment of a split inductor for use with the energy storage system.

Finally, turning to FIG. 11 a third alternate embodiment of the inductor assembly 800 and discharge electrode 200 configuration is shown. The split inductor 800 of this embodiment is translated up and down as indicated by the arrows 808, 810 shown in FIG. 11. This embodiment also includes two semi-coils 802, 804. Semi-coil 802 is connected in a fixed position to the apparatus 100 constantly and semi-coil 804 has a mounting leg 806 that is mounted to the central electrode 201 of the discharge electrode assembly 200 at its upper section. Semi-coil 804 is translated in an up and down direction. In this regard, the central electrode 201 of the discharge electrode assembly 200 must be slidably movable up and down with respect to the bus panels 108 and 122 through which it passes. Movement of the central electrode 201 is shown by the dashed lines in FIG. 11 indicating the alternate position of the electrode assembly 200 and semi coil 804, and is interfittingly engaged and aligned together with the fixed semi-coil 802 and is selectively connected to and disconnected from the respective ends of semi-coil 802 during each working cycle. The semi-coil 804 can be articulated by using a variety of different mechanical means, such as air pressure cylinders, or motors dependent on productivity requirements for loading and unloading operations.

It can therefore be seen that present energy storage system provides the unique ability to generate a high frequency short duration impulse for superior welding quality. The storage system further provides the ability to selectively disconnect capacitors to control voltage, frequency and duration of the impulse. For these reasons, the instant invention is believed to represent a significant advancement in the art which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A high current induction tool assembly for use in a magnetic pulse welding and forming system, said induction tool assembly being effective for generating a high velocity repulsive magnetic force to collapse materials positioned therein, said induction tool comprising:
  a first quarter coil having an inner peripheral edge, an outer peripheral edge, an upper end, a lower end and a contact plate at said lower end thereof;
  a second quarter coil having an inner peripheral edge, an outer peripheral edge, an upper end, a lower end and a contact plate at said lower end thereof;
  a semi coil having an inner peripheral edge, an outer peripheral edge, a first end and a second end; and
  a means for selectively holding said first end of said semi coil in electrical communication with said upper end of said first quarter coil and said second end of said semi coil in electrical communication with said upper end of said second quarter coil.

2. The induction tool assembly of claim 1 further comprising:
  conductive insert elements received in corresponding interfitting formations provided in said upper ends of first and second quarter coils and in said bottom ends of semi coil, said insert elements registerably aligning the ends of the semi-coil with the ends of the quarter coils when said coils are brought into electrical communication, said insert elements further facilitating the necessary contact pressure to be applied to the interface between said coils, and insuring proper electrical contact between said coils.

3. The induction tool of claim 2 wherein said insert elements are wedge shaped.

4. The induction tool of claim 2 wherein said insert elements are cylindrical shaped.

5. The induction tool of claim 1 wherein said means for holding said coils in electrical communication exerts a compressive force of not less than 1 kg/sq.mm.

6. The induction tool of claim 5 wherein said means for holding said coils in electrical communication exerts a compressive force of not less than 2 kg/sq.mm.

7. A high-current induction tool assembly for use in a magnetic pulse welding and forming system, said induction tool assembly being effective for generating a high velocity repulsive magnetic force to collapse materials positioned therein, said induction tool comprising:
  a first semi coil having an inner peripheral edge, an outer peripheral edge, an upper end, a lower end and a contact plate at said lower end thereof, said contact plate of said first semi coil being secured in a fixed position;
  a second semi coil having an inner peripheral edge, an outer peripheral edge, an upper end, a lower end and a contact plate at said lower end thereof; and
  means for selectively moving and holding said second semi coil into and out of electrical communication with said first semi coil.

8. The induction tool assembly of claim 7 wherein said second semi coil is mounted on a first end of a rotatable arm, and said arm is rotatably movable for moving said second semi coil relative to said first semi coil.

9. The induction tool assembly of claim 8 wherein a second end of said rotatable arm is in electrical communication with a central electrode of a discharge device, said central electrode being rotatable relative to said bus system.

10. The induction coil of claim 7 wherein said second semi coil is slidably movable relative to said first semi coil.

11. The induction tool assembly of claim 7 further comprising:
  a conductive insert element received in a corresponding interfitting formation provided in said upper ends of one of said first and second semi coils, said insert element registerably aligning the ends of the semi-coils when said coils are brought into electrical communication, said insert element further facilitating the necessary contact pressure to be applied to the interface between said coils, and insuring proper electrical contact between said coils.

12. The induction tool of claim 11 wherein said insert element is wedge shaped.

13. The induction tool of claim 11 wherein said insert element is cylindrical shaped.

14. The induction tool of claim 7 wherein said means for holding said coils in electrical communication exerts a compressive force of not less than 1 kg/sq.mm.

15. The induction tool of claim 14 wherein said means for holding said coils in electrical communication exerts a compressive force of not less than 2 kg/sq.mm.

16. An induction tool assembly for use in a magnetic pulse welding and forming system, comprising:
  a first semi coil having an inner peripheral edge, an outer peripheral edge, an upper end, a lower end and a contact plate at said lower end thereof,
    said contact plate of said first semi coil being secured in a fixed position;
  a second semi coil having an inner peripheral edge, an outer peripheral edge, an upper end, a lower end and a contact plate at said lower end thereof,
    said second semi coil being mounted on a first end of a rotatable arm,
    said rotatable arm having a second end in electrical communication with a central electrode of a discharge device,
    said central electrode being rotatable relative to an electrical bus system,
    said arm being rotatably movable for moving said second semi coil relative to said first semi coil; and
  means for selectively moving and holding said second semi coil into and out of electrical communication with said first semi coil.

* * * * *